(No Model.)

G. S. MOTT.
DUPLEX TELEGRAPH.

No. 258,103. Patented May 16, 1882.

Witnesses
Harry Drury
James F Tobin

Inventor
Garret S. Mott
by his attorneys
Howson and Son

UNITED STATES PATENT OFFICE.

GARRET S. MOTT, OF PHILADELPHIA, PENNSYLVANIA.

DUPLEX TELEGRAPH.

SPECIFICATION forming part of Letters Patent No. 258,103, dated May 16, 1882.

Application filed March 25, 1882. (No model.)

*To all whom it may concern:*

Be it known that I, GARRET S. MOTT, a citizen of the United States, and a resident of Philadelphia, Pennsylvania, have invented certain Improvements in Duplex Telegraphy, of which the following is a specification.

My invention relates to an improvement in the system of duplex telegraphy for which I obtained Letters Patent of the United States, No. 243,289, dated June 21, 1881; and my invention consists in combining with the main battery, transmitter, and relay at each station a local battery permanently in circuit through the coils of the relay, while the main battery goes to line through one portion of the relay, and has a ground-connection through the other portion of the relay and a rheostat, the balance in the home relay being secured when the home battery goes to line by neutralizing the effect of the local battery in one or other portion of the relay, as more fully described hereinafter.

Figure 1:
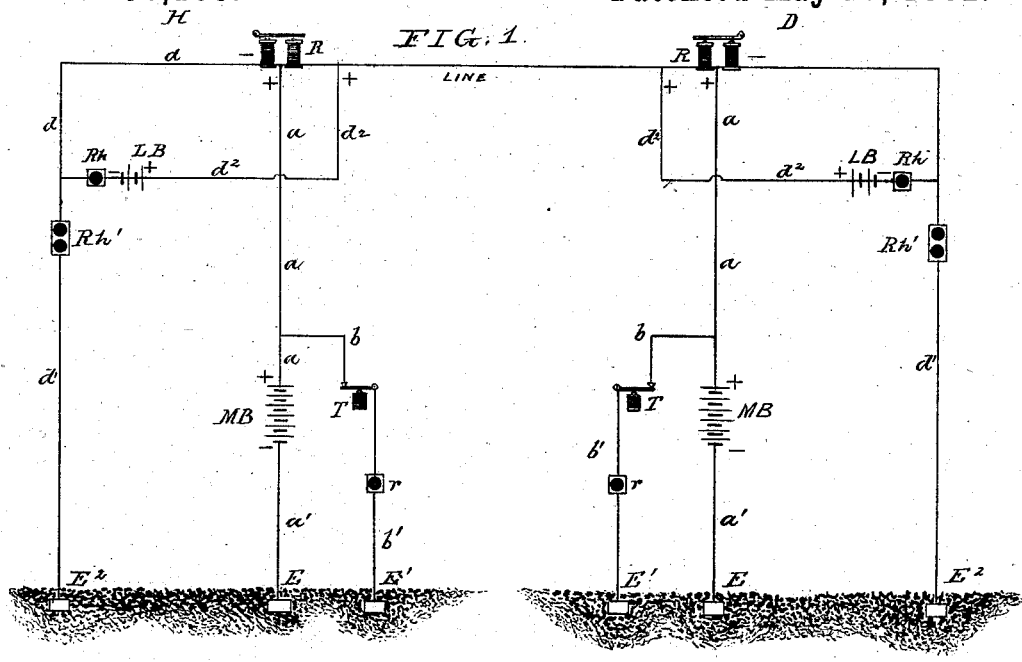
Figure 2:
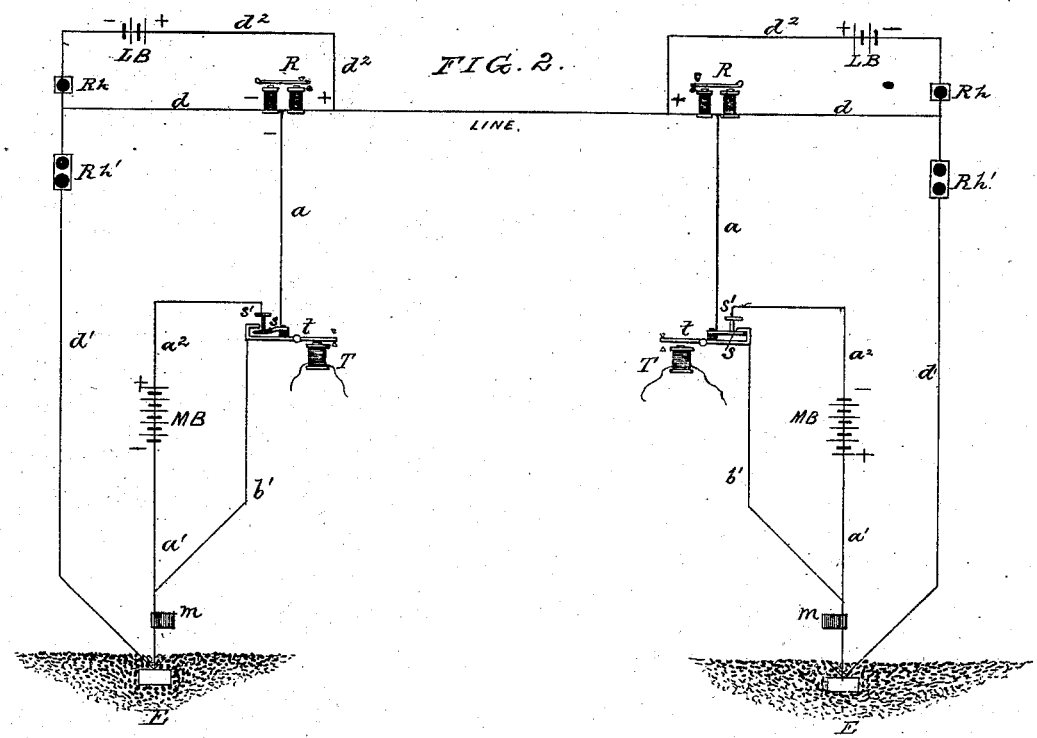

In the accompanying drawings, Figure 1 is a diagram illustrating my invention, and Fig. 2 a diagram of a modification.

Referring to Fig. 1, H may be taken to represent the home station, and D the distant station, the arrangement of circuits at each being the same. The main battery M B at each station has a ground-connection, E, through the wire $a'$, and goes to line through the wire $a$ and a portion of the relay R, and has a ground-connection at $E^2$ through the other portion of the relay and wires $d$ and $d'$, containing a resistance Rh', which is adjustable in respect to the resistance of the line to allow the other only a proper proportion of the current from the home main battery to pass to the ground $E^2$ when the battery is thrown on the line.

The wire $a$ is also connected, through the wire $b$, with the back stop of the armature of the transmitter T, this armature being grounded at E through the wire $b'$, preferably containing a resistance, $r$.

The wire $d$ forms part of a local circuit, $d$ $d^2$, containing a battery, L B, permanently in circuit through both portions of the relay R, this local circuit also containing a resistance, Rh, to adjust the resistance in the local circuit in respect to that of the line and the strength of the main battery. The retractor of the relay-armature is so adjusted as to overcome the attraction of the magnets due to the current from the local battery passing through the coils. The batteries M B at the two stations in this case have similar poles to the line, and the local batteries L B also have same poles to the line (through $d^2$) as the main battery.

When the transmitter T is open the armature is in contact with its back stop, and the main battery is thus short-circuited through wire $b$, armature, wire $b'$, ground, and wire $a'$, the relay being then unaffected to any appreciable extent by this battery. When the transmitter is closed the short circuit is broken, and the main battery goes to line over the conductor $a$ and one portion of the relay, and to the ground through the other portion of the relay and rheostat and conductors $d$ $d'$; but this does not affect the balance of the home relay, because the current going to line from the main battery being of the same polarity as the current flowing through the coils of the same portion of the relay in the opposite direction from the local battery, the magnetic effects of the currents on that core or portion of the core of the relay neutralize each other, and the strength of the current in the other portion of the relay is proportionately increased. Hence there is practically the same pull on the armature of the home relay whether the home battery be thrown on the line or not, and the armature is operated only by the incoming current from the battery at the distant station. If the home transmitter is closed, the home battery being neutralized by the local battery, an incoming current closes the relay.

Instead of arranging the main batteries with similar poles to the line, they may have opposite poles to the line, as in the modification, Fig. 2, the batteries in the local circuits also having poles opposite to those of the main battery, connected to the line through $d^2$. In this instance I have also shown the transmitter as provided with a "circuit-preserving" armature-lever instead of the plain armature, so that the main battery may be cut out, instead of short-circuited, when the transmitter is open.

The main battery, instead of being connected directly by the conductor $a$ to the relay, is connected by a conductor, $a^2$, to a stop, $s'$, above the insulated spring-contact $s$ of the armature-lever $t$, this contact $s$ being connected by the wire *a* to the relay, while the end of the armature-lever is connected by the wire *b'* to the ground. With this exception and the change in the polarities of the batteries, this system, Fig. 2, is the same as that shown in Fig. 1, the portion of the relay in which the effect of the local battery is neutralized being in this case that between the conductors *a* and *d*.

The local batteries and rheostats Rh may be arranged in any positions in their local circuits which may be convenient, but preferably as shown in the drawings.

A magnetic coil or coils *m*, Fig. 2, may be placed in circuit between the point of connection of the wires *a'* and *b'* and the ground in such manner as to permit discharge from the coil to pass to line when the battery is withdrawn.

I claim as my invention—

1. A duplex-telegraph station having a transmitter, relay, resistances, and circuits, substantially as described, with a main battery which goes to line through one portion of the relay, and has a ground-connection through the other portion of the relay and a rheostat, and a local battery permanently in circuit through both portions of the relay, substantially as set forth.

2. A duplex-telegraph station having a transmitter, relay, resistances, and circuits, substantially as described, with a main battery having a local circuit through the transmitter, and a magnetic coil, *m*, between the connection of the wires *a' b'* of this local circuit and the ground, as and for the purpose set forth.

In testimony whereof I have signed my name to this specification in the presence of two subscribing witnesses.

GARRET S. MOTT.

Witnesses:
JOSEPH FETTRETCH,
FRANK MOSS.